United States Patent
Song

(10) Patent No.: US 7,440,437 B2
(45) Date of Patent: Oct. 21, 2008

(54) METHOD AND APPARATUS FOR SCHEDULING DOWNLINK CHANNELS IN AN ORTHOGONAL FREQUENCY DIVISION MULTIPLE ACCESS SYSTEM AND A SYSTEM USING THE SAME

(75) Inventor: Jong-Ho Song, Seoul (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 704 days.

(21) Appl. No.: 11/128,244

(22) Filed: May 13, 2005

(65) Prior Publication Data

US 2005/0265223 A1   Dec. 1, 2005

(30) Foreign Application Priority Data

May 14, 2004   (KR) .................. 10-2004-0034480

(51) Int. Cl.
H04J 1/00   (2006.01)
(52) U.S. Cl. .................. 370/343; 370/208; 370/480; 455/69; 455/452.2
(58) Field of Classification Search ............. 370/203, 370/208, 254, 341, 343, 431, 480; 455/67.11, 455/67.14, 69, 450, 451, 452.2, 453, 455, 455/464, 509, 515, 516, 517
See application file for complete search history.

(56) References Cited

U.S. PATENT DOCUMENTS

| | | | | |
|---|---|---|---|---|
| 5,752,194 A | * | 5/1998 | Lin et al. .................. | 455/452.1 |
| 5,914,933 A | * | 6/1999 | Cimini et al. ............... | 370/208 |
| 6,940,827 B2 | * | 9/2005 | Li et al. ..................... | 370/278 |
| 2002/0021685 A1 | * | 2/2002 | Sakusabe .................... | 370/338 |
| 2004/0176094 A1 | * | 9/2004 | Kim et al. ................... | 455/438 |
| 2004/0228272 A1 | * | 11/2004 | Hasegawa et al. ........... | 370/210 |
| 2005/0002461 A1 | * | 1/2005 | Giannakis et al. ........... | 375/259 |
| 2007/0026813 A1 | * | 2/2007 | Khan ......................... | 455/69 |

* cited by examiner

Primary Examiner—Duc Nguyen
Assistant Examiner—Anthony S Addy
(74) Attorney, Agent, or Firm—Roylance, Abrams, Berdo & Goodman

(57) ABSTRACT

A downlink channel scheduling method and apparatus for obtaining optimal system performance in a downlink of a wireless communication system using an orthogonal frequency division multiplexing (OFDM) scheme are provided. Terminals compute a plurality of channel capacities and search for a channel with a maximum capacity. The terminals send, to a base station (BS), feedback information including a channel number and a capacity value of the channel with the maximum capacity. The BS performs a first channel allocation process for allocating a channel with an optimal capacity to each terminal on the basis of the feedback information. The BS performs a second channel allocation process for allocating an adjacent channel to a corresponding terminal using the window bit when the terminal is not allocated a channel in the first channel allocation process.

25 Claims, 12 Drawing Sheets

METHOD AND APPARATUS FOR SCHEDULING DOWNLINK CHANNELS IN AN ORTHOGONAL FREQUENCY DIVISION MULTIPLE ACCESS SYSTEM AND A SYSTEM USING THE SAME

PRIORITY

This application claims the benefit under 35 U.S.C. 119(a) of an application entitled "Method and Apparatus for Scheduling Downlink Channels in an Orthogonal Frequency Division Multiple Access System, and System Using the Same" filed in the Korean Intellectual Property Office on May 14, 2004 and assigned Serial No. 2004-34480, the entire contents of which are incorporated herein by reference.

BACKGROUND OF THE INVENTION

1. Field of the Invention

The present invention relates generally to a channel allocation method and apparatus in a broadband wireless communication system. More particularly, the present invention relates to a downlink channel scheduling method and apparatus that can obtain optimal system performance in a downlink of a wireless communication system using an orthogonal frequency division multiplexing (OFDM) scheme.

2. Description of the Related Art

Wireless communication systems using a multicarrier transmission scheme were first applied to military radio communications in the late 1950's. An orthogonal frequency division multiplexing (OFDM) scheme serving as a representative multicarrier transmission scheme for overlapping orthogonal subcarriers started to be developed in the 1970's. The OFDM scheme converts a serially input symbol stream into parallel signals and modulates the parallel signals using a plurality of orthogonal subcarriers to transmit the modulated parallel signals. The OFDM scheme has been widely used for digital data communication technologies such as digital audio broadcasting (DAB), digital television (TV) broadcasting, wireless local area network (WLAN), and wireless asynchronous transfer mode (WATM).

The OFDM system is suitable for a wireless communication environment that does not ensure line of sight (LOS), and is robust against multipath fading in a multipath environment, thereby providing an efficient platform for high-speed data transmission. That is, the OFDM system can efficiently overcome frequency selective fading by dividing an entire channel into narrowband orthogonal subchannels and transmitting the subchannels.

Moreover, the OFDM system can eliminate inter symbol interference (ISI) by adding, to a header of a symbol, a cyclic prefix (CP) with an interval longer than that of a delay spread interval of a channel. Accordingly, the OFDM system is the most effective way to transmit data at high speed. Due to this merit, Institute of Electrical and Electronics Engineers (IEEE) 802.16a was standardized, which is incorporated herein by reference. IEEE 802.16a supports multicarrier systems such as OFDM and orthogonal frequency division multiple access (OFDMA) systems as well as single-carrier systems.

The OFDMA system divides the frequency domain into subchannels comprising a plurality of subcarriers, divides the time domain into a plurality of time slots, and allocates a subchannel to each user. The OFDMA system is based on a multiple access scheme capable of accommodating multiple users using limited frequency resources by performing resource allocation while taking into account both the time and frequency domains.

The OFDMA system can assign a plurality of subchannels configured by different subcarriers to different users. When an adaptive antenna system (AAS) is used to increase system capacity in the OFDMA system, a subchannel can be configured by adjacent subcarriers. When the AAS is used, better channels are allocated to users in different channel environments, such that a multiuser diversity gain can be obtained.

When a multiple-input multiple-output (MIMO) system is used as a representative example of the AAS, information is spatially multiplexed and then the spatially multiplexed information is transmitted, such that communication system performance can be significantly improved. The system performance in the MIMO environment was verified by experiment and analysis. IEEE 802.16a-based OFDMA systems are classified into a time division duplex (TDD) system using the same frequency band between an uplink and a downlink, and a frequency division duplex (FDD) system using different frequency bands between the uplink and the downlink.

In the OFDMA/FDD system of the OFDMA systems, a base station (BS) must receive, from all active user terminals, feedback information comprising channel capacity information necessary for scheduling channels to be allocated. However, when the channel capacity information is received from all user terminals through the feedback information, there is a problem in that a system load of the BS significantly increases.

SUMMARY OF THE INVENTION

It is, therefore, an aspect of the present invention to provide a downlink channel scheduling method and apparatus for obtaining optimal system performance by taking into account a channel state of each user terminal in an orthogonal frequency division multiple access/frequency division duplex (OFDMA/FDD) system in which frequency bands are different between a downlink and an uplink.

It is another aspect of the present invention to provide a downlink channel scheduling method and apparatus that can reduce the amount of feedback information for channel allocation to be transmitted from each user terminal to a base station (BS) in an orthogonal frequency division multiple access/frequency division duplex (OFDMA/FDD) system.

It is another aspect of the present invention to provide a downlink channel scheduling method and apparatus through which a base station (BS) receiving feedback information for channel allocation from each user terminal can adaptively allocate subchannels to a plurality of user terminals in an orthogonal frequency division multiple access/frequency division duplex (OFDMA/FDD) system.

It is yet another aspect of the present invention to provide a downlink channel scheduling method and apparatus through which a base station (BS) ensures fairness such that multiple user terminals can equally occupy channel resources in an orthogonal frequency division multiple access/frequency division duplex (OFDMA/FDD) system.

The above and other aspects of the present invention can be achieved by a method for scheduling downlink channels between a station (BS) and a plurality of terminals in an orthogonal frequency division multiple access (OFDMA) wireless communication system. The method comprises the steps of computing a plurality of channel capacities and searching for a channel with a maximum capacity in the terminals; sending feedback information comprising a channel number and a capacity value of the channel with the maximum capacity from the terminals to the BS; and allocating a channel with an optimal capacity to each terminal on a basis of the feedback information in the BS.

The above and other aspects of the present invention can also be achieved by an orthogonal frequency division multiple access (OFDMA) wireless communication system. The OFDMA wireless communication system comprises a plurality of terminals for computing a plurality of channel capacities, searching for a channel with a maximum capacity, generating feedback information comprising a channel number and a capacity value of the channel with the maximum capacity, and sending the generated feedback information to a wireless network; and a base station (BS) for allocating a channel with an optimal capacity to each terminal on a basis of the feedback information received from the plurality of terminals.

The above and other aspects of the present invention can also be achieved by a method for generating feedback information from a terminal for downlink channel scheduling of a base station (BS) in an orthogonal frequency division multiple access (OFDMA) wireless communication system. The method comprises the steps of searching for a channel with a maximum capacity from a plurality of channels; estimating an adjacent channel range of the channel with a maximum capacity; generating a predetermined window bit for determining the adjacent channel range; and generating feedback information comprising a channel number and a capacity value of the channel with the maximum capacity.

The above and other aspects of the present invention can also be achieved by an apparatus for generating feedback information from a terminal for downlink channel scheduling of a base station (BS) in an orthogonal frequency division multiple access (OFDMA) wireless communication system. The apparatus comprises a channel capacity calculator for computing a plurality of channel capacities and searching for a channel with a maximum capacity; a window estimator for estimating an adjacent channel range of the channel with the maximum capacity; a window bit decider for generating a predetermined window bit for determining the adjacent channel range; and a feedback information combiner for generating feedback information including a channel number and a capacity value of the channel with the maximum capacity.

The above and other aspects of the present invention can also be achieved by a method for scheduling downlink channels in a base station (BS) of an orthogonal frequency division multiple access (OFDMA) wireless communication system. The method comprises the steps of receiving, from a plurality of terminals, feedback information comprising channel information associated with a maximum capacity and a predetermined window bit indicating an adjacent channel range; allocating a channel with the maximum capacity to each terminal on a basis of the feedback information; and allocating an adjacent channel to a corresponding terminal using the predetermined window bit when the terminal is not allocated a channel with the maximum capacity.

The above and other aspects of the present invention can also be achieved by an apparatus for scheduling downlink channels in a base station (BS) of an orthogonal frequency division multiple access (OFDMA) wireless communication system. The apparatus comprises a first channel allocator for receiving, from a plurality of terminals, feedback information for channel allocation, and allocating a channel with a maximum capacity to each terminal; and a second channel allocator for allocating a channel to each terminal in an adjacent channel range of the maximum capacity channel determined on a basis of the feedback information, the feedback information comprising channel information associated with the maximum capacity and a predetermined window bit indicating the adjacent channel range.

BRIEF DESCRIPTION OF THE DRAWINGS

The above and other aspects and advantages of the present invention will be more clearly understood from the following detailed description taken in conjunction with the accompanying drawings, in which.

Throughout the drawings, the same or similar elements are denoted by the same reference numerals.

DETAILED DESCRIPTION OF EXEMPLARY EMBODIMENTS

Embodiments of the present invention will be described in detail herein below with reference to the accompanying drawings. In the following description, a detailed description of known functions and configurations incorporated herein will be omitted for conciseness. Additionally, in the following description, the term 'channel' may indicate a subchannel.

First, a channel structure of an adaptive antenna system (AAS) in an orthogonal frequency division multiple access/frequency division duplex (OFDMA/FDD) system based on Institute of Electrical and Electronics Engineers (IEEE) 802.16a to which the present invention is applied will be described with reference to FIG. 1.

Figure 1:
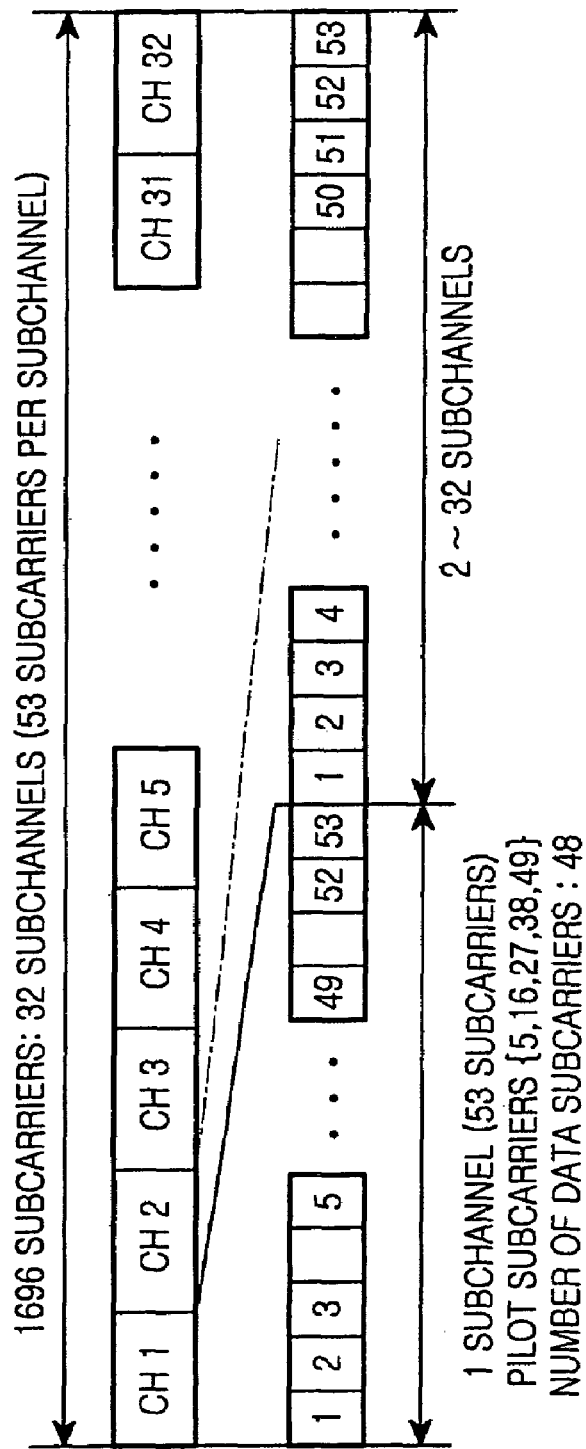
FIG. 1 illustrates a channel structure of an orthogonal frequency division multiple access (OFDMA) wireless communication system in accordance with an embodiment of the present invention.

That is, FIG. 1 illustrates a channel structure of an OFDMA wireless communication system in accordance with an embodiment of the present invention.

The channel structure of FIG. 1 is configured by 2,048 subcarriers. The total number of used subcarriers except for guard subcarriers allocated to guard intervals is 1,696. One subchannel comprises 53 subcarriers for transmitting pilot signals and data, and the total number of subchannels is 32. One subchannel comprises 53 subcarriers comprising 48 data subcarriers and 5 pilot subcarriers as illustrated in FIG. 1. It is assumed that the present invention allocates one subchannel to one user terminal by taking into account characteristics of user channels having different channel paths.

In the channel structure of FIG. 1, an embodiment of the present invention allocates one subchannel to one user terminal. Each user terminal can identify all channel capacities. Each user terminal provides feedback information such that a base station (BS) can allocate channels on the basis of channel capacity information. The present invention reduces the amount of feedback information using a window scheme to be described below, and fairly allocates time slots to user terminals using a fairness scheme to be described below.

Figure 2:
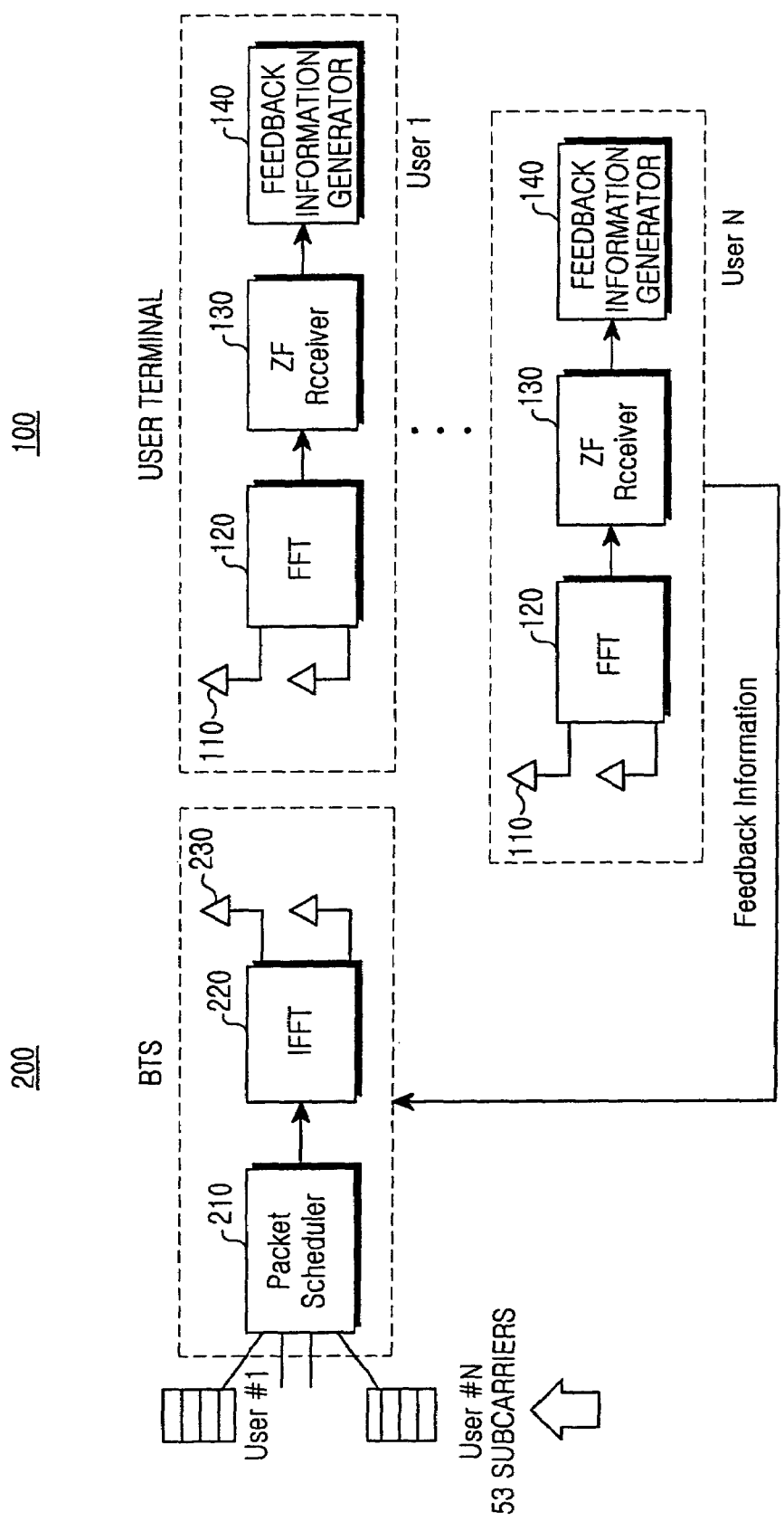
FIG. 2 is a block diagram illustrating a structure of an OFDMA wireless communication system in accordance with an embodiment of the present invention.

FIG. 2 is a block diagram illustrating a structure of an OFDMA wireless communication system in accordance with an embodiment of the present invention. The OFDMA wireless communication system comprises user terminals 100 each generating the feedback information using the window scheme and sending the generated feedback information, and a BS 200 for receiving the feedback information from the user terminals 100 and performing channel allocation scheduling for the user terminals 100. The user terminals 100 and the BS 200 use the AAS such that adjacent subcarriers can form a subchannel. Accordingly, the user terminals 100 and the BS 200 use at least two antennas 110 and 230, respectively.

In FIG. 2, the user terminal 100 receives data from the antennas 110 through a wireless network, and transforms data received through a Fast Fourier Transform (FFT) processor 120 into the frequency domain. A zero-forcing (ZF) receiver 130 receives and outputs an OFDMA symbol from a channel $H_k(f)$. A feedback information generator 140 receiving the OFDMA symbol computes a channel capacity, searches for a channel with an optimal capacity, estimates the capacity of each channel adjacent to the optimal capacity channel using the window scheme in accordance with an embodiment of the present invention, and sets a predetermined window (or feedwidth) bit for determining an adjacent channel range. The user terminal 100 generates feedback information by combining channel information associated with the optimal capacity, adjacent channel information, and the window (or feedwidth) bit, and sends the generated feedback information to the BS 200.

The BS 200 schedules channels to be allocated to the user terminals 100 on the basis of the feedback information sent from the user terminals 100. In this case, a packet scheduler 210 of the BS 200 searches for an optimal capacity channel for each user terminal 100. When the optimal capacity channel has already been allocated to a different user, the packet scheduler 210 performs a scheduling operation such that a channel can be allocated to a corresponding user terminal 100 within an adjacent channel range determined through the feedwidth bit.

An Inverse Fast Fourier Transform (IFFT) processor 220 of the BS 200 transforms data to be transmitted to the user terminals 100 into the time domain using IFFT, generates an OFDMA symbol, and transmits the generated OFDMA symbol to the wireless network through the antennas 230.

The channel structure of FIG. 1 uses one antenna. However, the system of the present invention using at least two antennas transmits an OFDMA symbol using a channel pair based on the channel structure of FIG. 1. That is, adjacent subcarriers can configure a subchannel using the AAS. The user terminal 100 with the optimal capacity of each subchannel is selected using statistical and independent fading characteristics associated with each user, such that a multiuser diversity gain can be obtained. When an embodiment of the present invention is applied to the OFDMA/FDD system, AAS is used. It shall be noted that one antenna may be used when the AAS is applied to a mobile communication system of a different scheme such as High-speed Portable Internet (HPI).

The feedback information used for multiple users uses a mean capacity between 53 subcarriers as the subchannel capacity of each user terminal 100. In the BS 200 of the AAS, the capacity of the i-th subchannel associated with active User Terminal k 100 is a capacity sum of 53 subcarriers configuring an occupied channel. When an additive white Gaussian noise (AWGN) multiple-input multiple-output (MIMO) system with a channel $H_k(f)$ uses a zero-forcing (ZF) receiver, the capacity of subcarriers configuring each subchannel and the subchannel capacity are expressed as shown in Equation (1).

$$C_{ZF,k}(f) = \sum_{m=1}^{M_t} \log\left(1 + \frac{P_k(f)}{N_k(f)M_t} \frac{1}{[H_k(f)H_k^H(f)]_{mm}^{-1}}\right) \quad \text{Equation (1)}$$

$$C_{ZF,k}(i) = \sum_{f=53(i-1)+1}^{53i} C_{ZF,k}(f),$$

where $f \in \{1, 2, 3, \ldots, 1696\}$ denotes a subcarrier index, $i \in \{1, 2, 3, \ldots, 32\}$ denotes each subchannel index, and $N_k(f)$ denotes noise power density associated with User Terminal k. In Equation (1), $P_k(f)$ denotes power density of a signal transmitted to User Terminal k through Subcarrier f, and $H_k(f)$ denotes a frequency response associated with User Terminal k. The BS must receive, from each user terminal, channel capacity information for scheduling such that multiuser diversity can be obtained. The user terminals send quantized channel capacity values.

When the number of bits of feedback information required to satisfy the maximum capacity is computed using a conventional scheme, the number of bits for indicating 32 subchannel indices is 5, and the number of bits for indicating a quantized channel capacity value is M. The conventional feedback information requires a relatively large number of bits corresponding to (5+M)×32 bits.

A window scheme for reducing the number of bits of the feedback information in accordance with an embodiment of the present invention will now be described.

The window scheme is provided to transmit information about a subchannel with the maximum capacity among 32 subchannels of the OFDMA system, a capacity value of a corresponding subchannel, and one 'feedwidth' bit, for example, for determining an adjacent channel range of the subchannel with the maximum capacity. When the window scheme was compared with the conventional full feedback scheme for feeding back information about all subchannels according to simulation, it could be found that the two schemes had almost the same performance. Simulation results will be described in more detail.

Because frequency characteristics of adjacent subcarriers are coherent in OFDMA symbols going through channels, the window scheme uses characteristics in which capacity of the best subchannel is similar to that of an adjacent subchannel. Capacity information of each subchannel for transmitting an OFDMA symbol is collected using Equation (2).

$$i_{\max} = \arg\max(C_{ZF,k}(i)), \quad \text{Equation (2)}$$

$$i = \text{subchannel index}, \quad i \in \{1, 2, 3, \ldots, 32\}$$

$$C_{ZF,k}(i) = \sum_{f=53(i-1)+1}^{53i} C_{ZF,k}(f),$$

$$f = \text{subcarrier index}, \quad f \in \{1, 2, \ldots, 1696\}$$

$$C_{\max,k}(i) = C_{ZF,k}(i_{\max})$$

$$C_{avr,k}(i) = \frac{1}{32}\sum_{i=1}^{32} C_{ZF,k}(i), \quad i \in \{1, 2, 3, \ldots, 32\}$$

In Equation (2), $i_{max}$ denotes an index of a subchannel with the maximum capacity, $C_{ZF,k}(i)$ denotes a capacity of the i-th subchannel, $C_{max,k}(i)$ denotes the maximum capacity of the i-th subchannel, and $C_{avr,k}(i)$ denotes the mean channel capacity.

Figure 3:
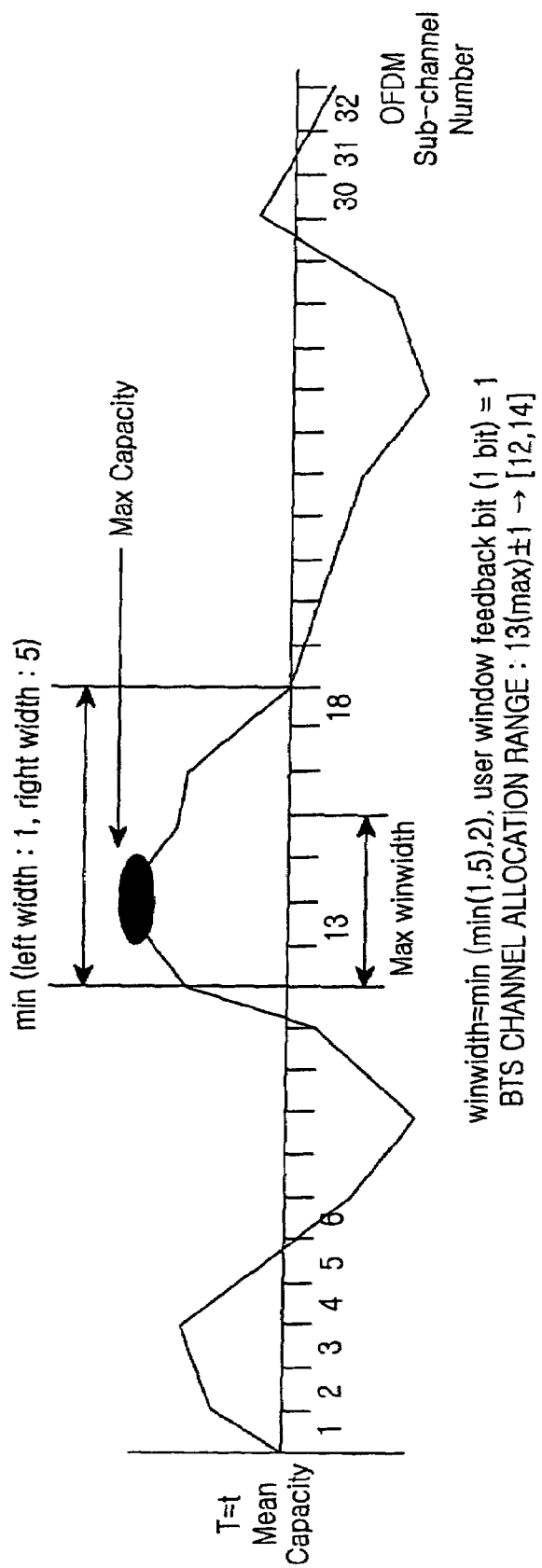
FIG. 3 is a graph illustrating a window scheme used for a downlink channel scheduling method in accordance with an embodiment of the present invention.

FIG. 3 is a graph illustrating a window scheme used for a downlink channel scheduling method in accordance with an embodiment of the present invention. FIG. 3 illustrates an example of a process for determining adjacent channel information and a window bit in feedback information of User Terminal k.

In FIG. 3, the vertical axis denotes the mean channel capacity, and an adjacent channel range is determined by a lower limit based on the mean channel capacity. Referring to a possible adjacent channel range in FIG. 3, it can be found that left and right width values of a subchannel with the maximum capacity are set to 1 and 5 in a capacity range greater than the mean capacity, respectively.

In this embodiment, the left width value of 1 determined as the minimum value between both the width values of FIG. 3 is selected. A limit of a window is set to a two-channel range serving as the maximum range for basically allocating a channel within a coherent bandwidth. An adjacent channel range is set to the left width value of 1 that is the minimum value between the maximum range threshold value of 2 (or ±2) and the left width value of 1.

The BS attempts to allocate Subchannel 13 with the maximum capacity using feedback information received from the user terminal, for example, as illustrated in FIG. 3. If Subchannel 13 has already been allocated to a different user terminal, i.e., if subchannel allocation has failed, a 'feedwidth' bit value of 1 is sent. An available subchannel of Subchannels 12 and 14 belonging to the window range of 1 in the left and right directions of Subchannel 13 is searched for. A process for determining an adjacent channel range associated with User Terminal k is defined as shown in Equation (3).

$$\text{window} = \min(\text{left width}, \text{right width}) \quad \text{Equation (3)}$$

$$\text{winwidth} = \min(\text{window}, 2)$$

$$\text{feedwidth} = \begin{cases} 0, & \text{winwidth} = 1 \\ 1, & \text{winwidth} = 2 \end{cases}$$

In Equation (3), 'window' defines an adjacent channel range of left and right widths with capacity greater than the mean capacity when a subchannel with the maximum capacity is set as a reference. For example, 'winwidth' is used for setting, to a left and right range value of adjacent subchannels, a lower value when the left and right range value of the maximum capacity channel is compared with a threshold value thereof. When an adjacent channel range is set by the above-described feedwidth bit, 'feedwidth' is set to 0 if left and right width values are 1, respectively, and is set to 1 when left and right width values are 2, respectively.

Figure 4:
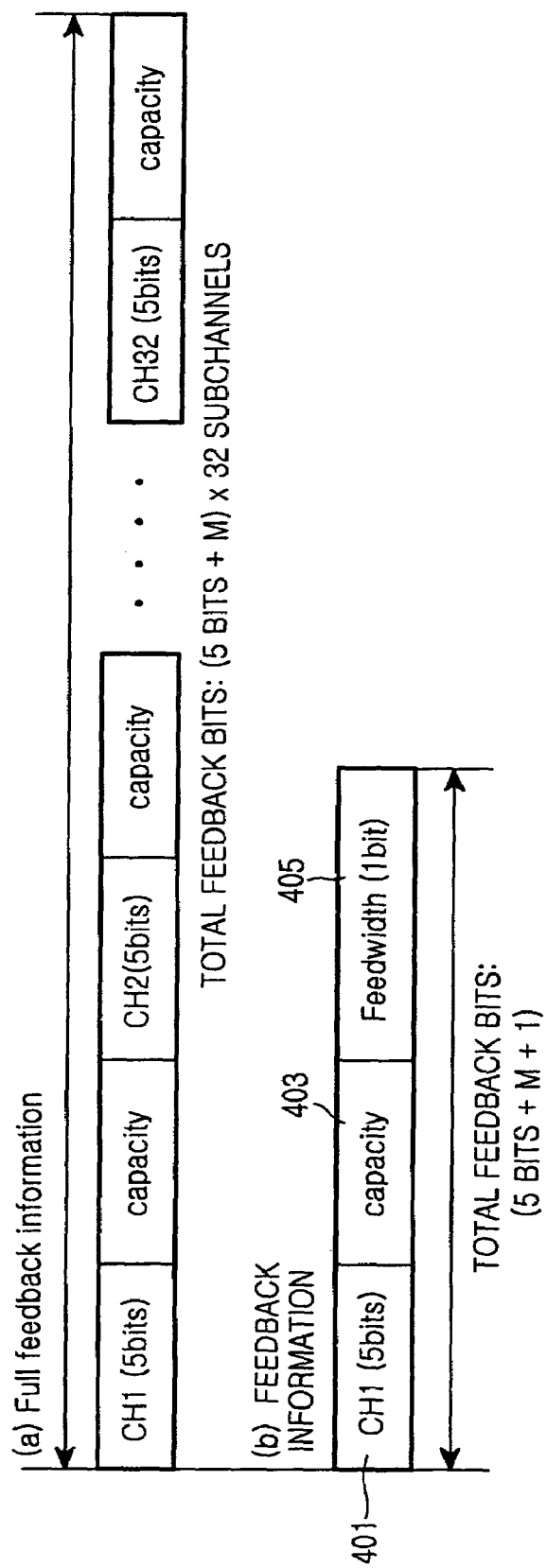
FIG. 4 illustrates a structure of feedback information fields used for the downlink channel scheduling method in accordance with an embodiment of the present invention.

FIG. 4 illustrates a structure of feedback information fields used for the downlink channel scheduling method in accordance with an embodiment of the present invention. In FIG. 4, (a) illustrates a case where capacities of all channels are computed by the conventional method, and full feedback information is generated, and (b) illustrates a channel index 401 with the optimal capacity, channel capacity 403, and a feedwidth bit 405 in accordance with an embodiment of the present invention.

The feedback information of User Terminal k determined by Equation (3) is configured as illustrated in (b) of FIG. 4, and is transmitted to the BS. The BS searches for an available channel using the feedback information received from each user terminal, and allocates the available channel to each user terminal. A process for allocating an OFDMA subchannel to each user terminal using a limited feedback structure in the BS will now be described in more detail. First, the user terminals are arranged in the order of capacity values of subchannels of an OFDM symbol. Different subchannels are allocated between the user terminal with the largest capacity value and the user terminal with the $32^{nd}$ capacity value. User terminals to which a subchannel is not allocated and user terminals with capacity values less than the $32^{nd}$ capacity value are re-arranged in the order of capacity values. Subsequently, an unallocated subchannel is searched for using one feedwidth bit.

$$\text{feedwidth} = \begin{cases} 0, & \text{Max Subchannel Number} \pm 1 \\ 1, & \text{Max Subchannel Number} \pm 1, \pm 2 \end{cases} \quad \text{Equation (4)}$$

When the 'feedwidth' bit indicates 0, an unallocated adjacent subchannel is searched for and allocated in the order of subchannel numbers of $i_{max}-1 \rightarrow i_{max}+1$ on the basis of the maximum capacity channel. When the 'feedwidth' bit indicates 1, an unallocated adjacent subchannel is searched for and allocated in the order of subchannel numbers of $i_{max}-1 \rightarrow i_{max}+1 \rightarrow i_{max}-2 \rightarrow i_{max}+2$. If all adjacent subchannels associated with the 'feedwidth' bit are occupied, no subchannel is allocated. In this case, the BS fairly distributes, to other user terminals with allocated subchannels, power for terminals to which no subchannel is allocated. As described above, if a corresponding subchannel is already allocated to a different user terminal when a subchannel is allocated to each user terminal, the window scheme performs secondary subchannel allocation, thereby improving system performance using feedback information corresponding to a small number of bits.

Next, an embodiment of the present invention will be described in more detail with reference to FIGS. 5 to 8.

Figure 5:
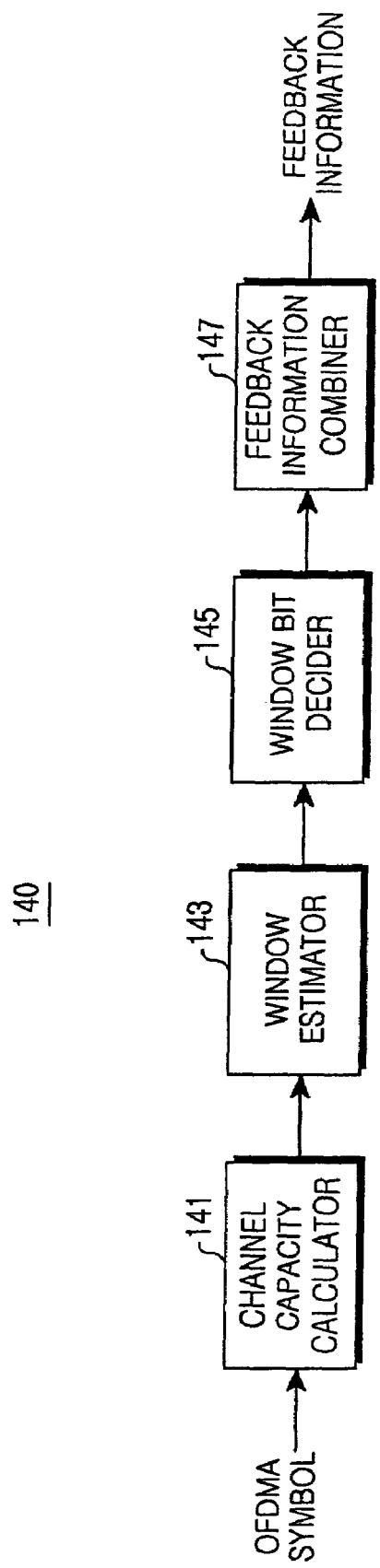
FIG. 5 is a block diagram illustrating an internal structure of a feedback information generator in accordance with an embodiment of the present invention.

FIG. 5 is a block diagram illustrating the internal structure of a feedback information generator in accordance with an embodiment of the present invention. FIG. 5 illustrates a structure of the feedback information generator 140 of FIG. 2.

In FIG. 5, a channel capacity calculator 141 receives an OFDM symbol, searches for a channel with an optimal capacity using Equations (1) and (2), and computes related information for determining an adjacent channel range. The channel capacity calculator 141 sends the computed information to a window estimator 143. The window estimator 143 determines the minimum left and right adjacent channel range for deciding the 'window (or feedwidth)' bit while narrowing a left and right adjacent channel range according to Equation (3). A window (or feedwidth) bit decider 145 compares the minimum adjacent channel range value determined through the window estimator 143 with the maximum threshold value within a predetermined coherent bandwidth, and decides the 'feedwidth' bit on the basis of the minimum value thereof. When the left and right adjacent channel range of a channel of the maximum capacity is ±1 as shown in Equation (4), the 'feedwidth' bit is 0. When the left and right adjacent channel range is ±2, the 'feedwidth' bit is 1. A feedback information combiner 147 combines the channel number 401, the channel capacity 403, and the 'feedwidth' bit 405, and generates the feedback information of FIG. 4 to send the generated feedback information to the BS 200.

Figure 6:
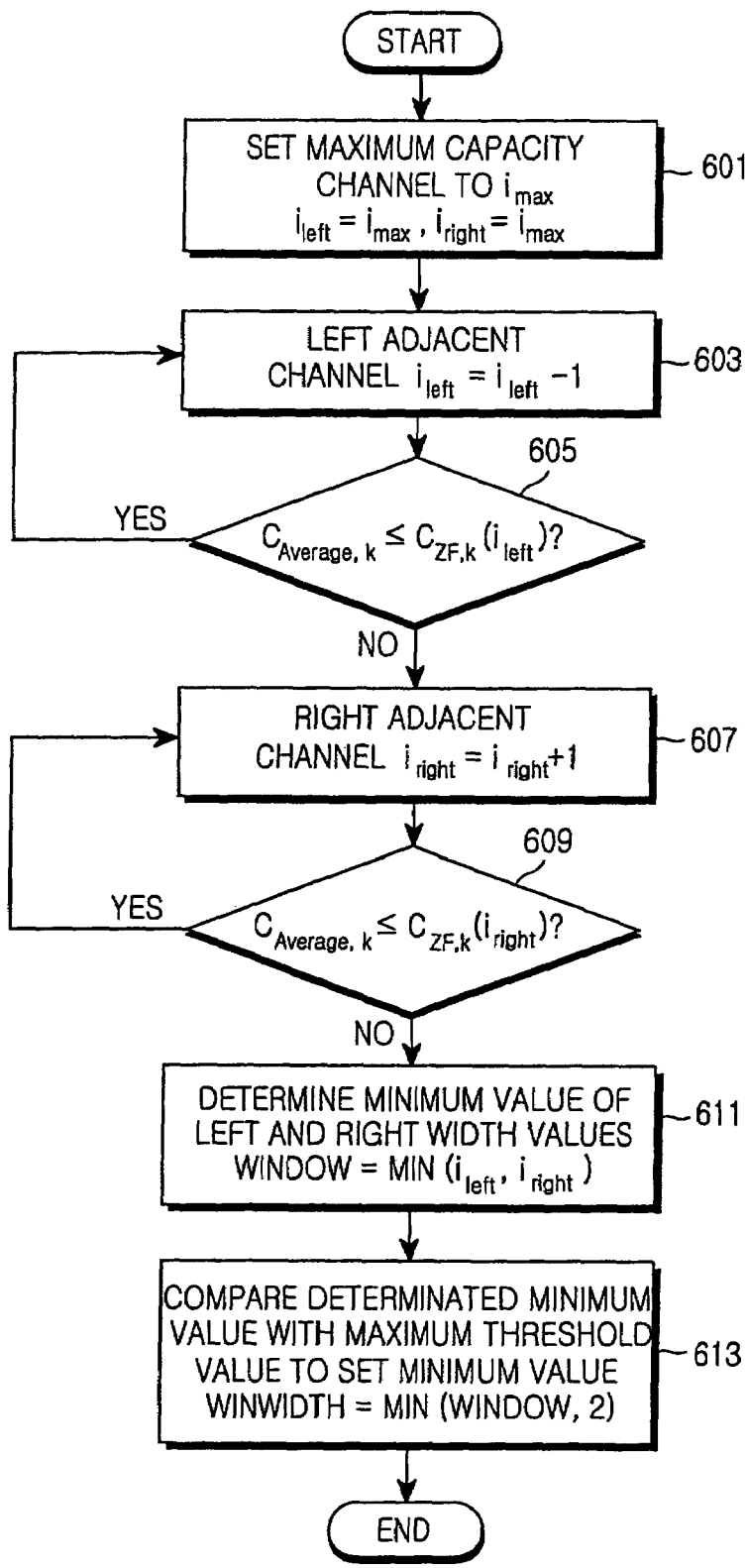
FIG. 6 is a flow chart illustrating a feedback information generation process in accordance with an embodiment of the present invention.

FIG. 6 is a flow chart illustrating a feedback information generation process in accordance with an embodiment of the present invention. The process of FIG. 6 is performed through the feedback information generator 140 of FIG. 2.

In step 601, when a subchannel with the maximum capacity among 32 subchannels is denoted by $i_{max}$, left and right adjacent subchannels $i_{left}$ and $i_{right}$ are initially set to $i_{max}$. In steps 603 and 605, the window estimator 143 searches for a lower channel range limit in which the capacity of the left adjacent channel $i_{left}$, $C_{ZF,k}(i_{left})$, is greater than or equal to the mean channel capacity $C_{avr,k}$ determined by Equation (2) while decrementing the left adjacent channel number $i_{left}$ by one. Subsequently, in steps 607 and 609, the window estimator 143 searches for a upper channel range limit in which the capacity of the right adjacent channel $i_{right}$, $C_{ZF,k}(i_{right})$, is greater than or equal to the mean channel capacity $C_{avr,k}$ while incrementing the right adjacent channel number $i_{right}$ by one.

In step 611, the window estimator 143 determines the minimum adjacent channel range on the basis of the subchannel with the maximum capacity $i_{max}$ in the left and right adjacent subchannels $i_{left}$ and $i_{right}$ determined in the steps 601 to 609. In step 613, the window bit decider 145 compares the minimum adjacent channel range value determined through the window estimator 143 with the maximum threshold (e.g., 2) within the predetermined coherent bandwidth, and determines the 'feedwidth' bit of 0 or 1 on the basis of the minimum winwidth value as shown in Equation (3).

Although not illustrated in FIG. 6, the feedback information combiner 147 combines the channel number, the channel capacity, and the 'feedwidth' bit as shown in FIG. 4, and generates the feedback information. In this case, when the optimal capacity channel is only allocated, the feedback information without the window bit can be generated.

Figure 7:
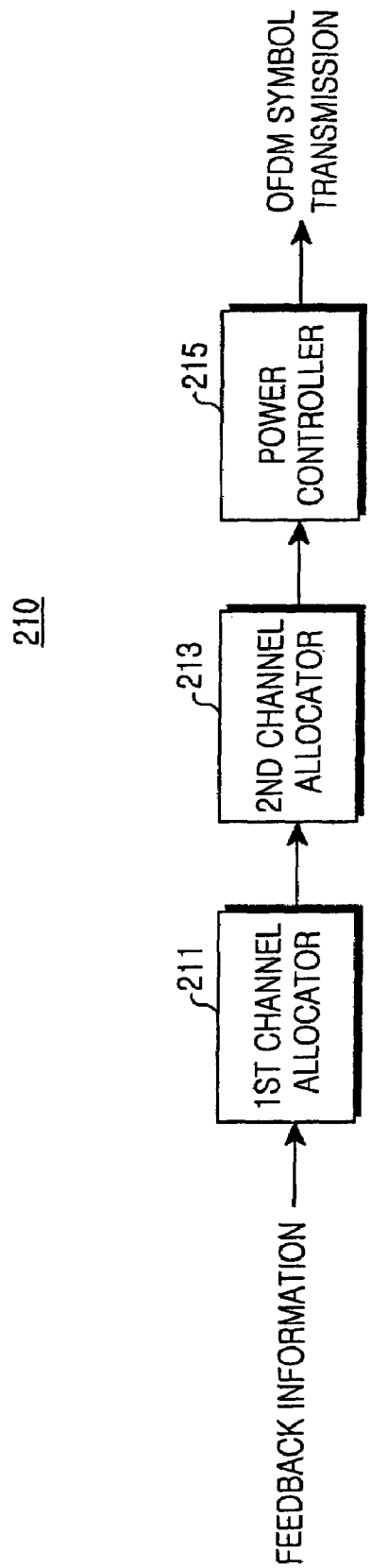
FIG. 7 is a block diagram illustrating an internal structure of a scheduler in accordance with the present invention.

FIG. 7 is a block diagram illustrating the internal structure of a scheduler in accordance with an embodiment of the present invention. FIG. 7 illustrates a structure of a packet scheduler 210 provided in the BS of FIG. 2.

In FIG. 7, a first channel allocator 211 allocates a channel of the optimal capacity to each user terminal 100 on the basis of feedback information received from the user terminals 100. When a corresponding user terminal 100 is not allocated the channel because a different user terminal 100 occupies the same channel, a second channel allocator 213 refers to the 'feedwidth' bit of the feedback information, and sets an adjacent channel range. The second channel allocator 213 determines if left and right adjacent channels within a ±1 or ±2 range from the channel with the optimal capacity have been allocated to other user terminals 100, and performs a scheduling operation according to a result of the determination. Here, the second channel allocator 213 identifies the 'feedwidth' bit determined through the process of FIG. 6. When the 'feedwidth' bit is 0, the second channel allocator 213 determines if a channel can be allocated in the left and right adjacent channel range of ±1, and performs channel allocation. However, when the 'feedwidth' bit is 1, the second channel allocator 213 sequentially determines if a channel can be allocated in the left and right adjacent channel range of ±1 and ±2, and performs channel allocation. When a user terminal 100 to which no channel is allocated is present after the first and second channel allocation processes, channel allocation is performed for the next user terminal. A power controller 215 of FIG. 7 fairly distributes, to other user terminals with allocated subchannels, power for terminals to which no subchannel is allocated.

Figure 8:
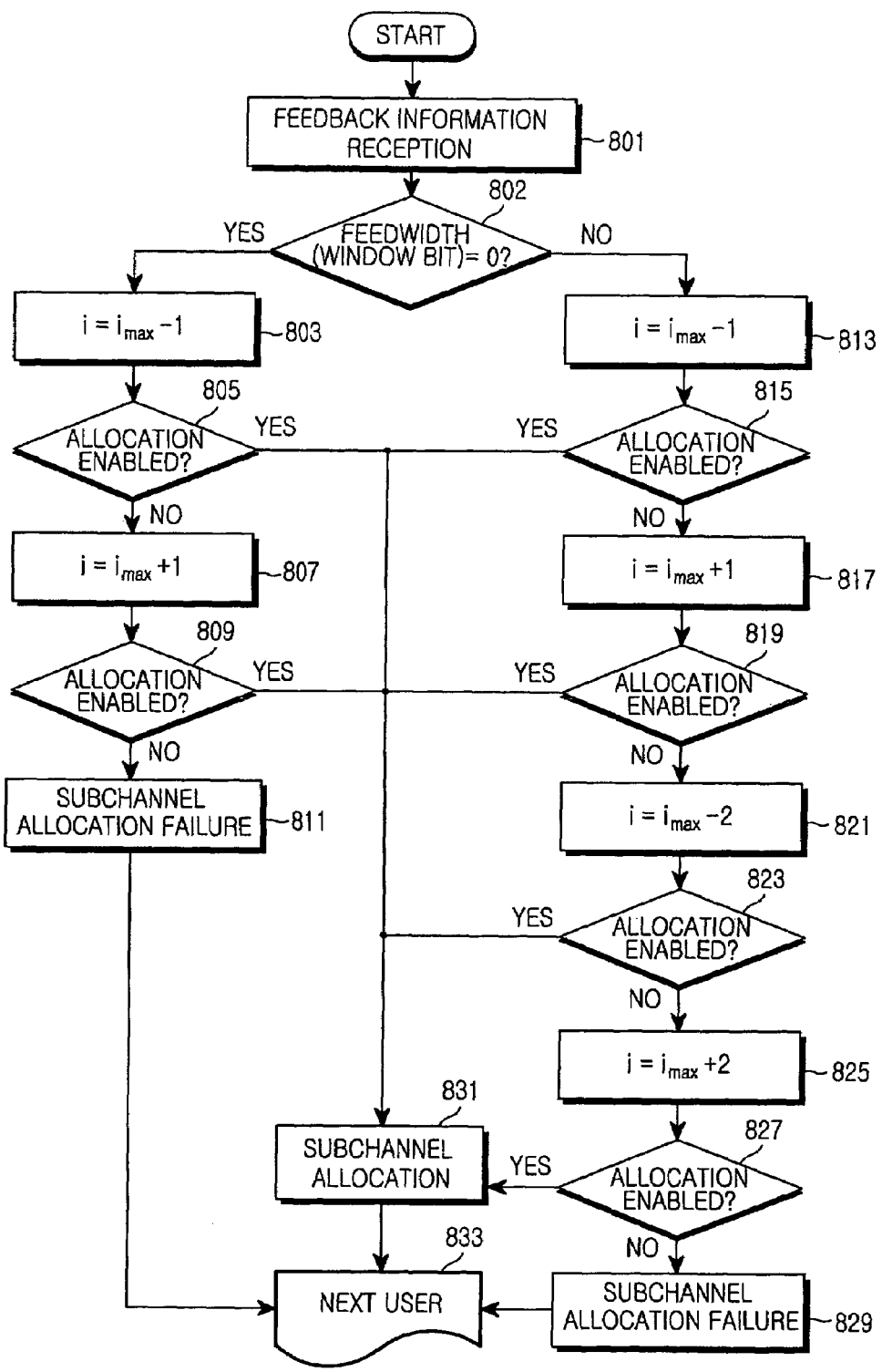
FIG. 8 is a flow chart illustrating a scheduling process in accordance with an embodiment of the present invention.

FIG. 8 is a flow chart illustrating a scheduling process in accordance with an embodiment of the present invention. The process of FIG. 8 is performed through the packet scheduler 210 of FIG. 2. It is assumed that the process of FIG. 8 receives feedback information, performs the first allocation process for allocating a channel with the optimal capacity to each user terminal 100, and performs the second allocation process when a target channel is already allocated to a different user terminal 100. In accordance with an embodiment of the present invention, the first allocation process is performed for all user terminals 100, and then the second allocation process is performed for user terminals 100 to which no channel is allocated. Alternatively, the second allocation process may be performed for each user terminal 100 when a target channel is already allocated immediately after the first allocation process is performed for the user terminal 100.

In step 801 of FIG. 8, the BS 200 receives feedback information from the user terminal 100. In step 802, the second channel allocator 213 of FIG. 7 identifies the 'feedwidth' bit included in the feedback information. When the 'feedwidth' bit is 0, the second channel allocator 213 determines if a channel can be allocated in a left adjacent channel range of −1 on the basis of a subchannel $i_{max}$ with the maximum capacity in steps 803 and 805. If a channel can be allocated in the left adjacent channel range of −1, the second channel allocator 213 proceeds to step 831 to perform channel allocation. However, if a channel can be allocated in the left adjacent channel range of −1, the second channel allocator 213 determines if a channel can be allocated in a right adjacent channel range of +1 in steps 807 and 809. If a channel can be allocated in the right adjacent channel range of +1, the second channel allocator 213 proceeds to step 831 to perform channel allocation.

On the other hand, in step 802, the second channel allocator 213 of FIG. 7 identifies the 'feedwidth' bit included in the feedback information. When the 'feedwidth' bit is 1, the second channel allocator 213 sequentially determines if a channel can be allocated in left and right adjacent channel ranges of ±1 and ±2. That is, the second channel allocator 213 determines if a channel can be allocated in a left adjacent channel range of −1 on the basis of a subchannel $i_{max}$ with the maximum capacity in steps 813 and 815. If a channel can be allocated in the left adjacent channel range of −1, the second channel allocator 213 proceeds to step 831 to perform channel allocation. However, if a channel can be allocated in the left adjacent channel range of −1, the second channel allocator 213 determines if a channel can be allocated in a right adjacent channel range of +1 in steps 817 and 819. If a channel can be allocated in the right adjacent channel range of +1, the second channel allocator 213 proceeds to step 831 to perform channel allocation.

However, if a channel cannot be allocated in the left and right adjacent channel range of ±1, the second channel allocator 213 determines if a channel can be allocated in a left adjacent channel range of −2 on the basis of a subchannel $i_{max}$ with the maximum capacity in steps 821 and 823. If a channel can be allocated in the left adjacent channel range of −2, the second channel allocator 213 proceeds to step 831 to perform channel allocation. However, if a channel cannot be allocated in the left adjacent channel range of −2, the second channel allocator 213 determines if a channel can be allocated in a right adjacent channel range of +2 in steps 825 and 827. If a channel can be allocated in the right adjacent channel range of +2, the second channel allocator 213 proceeds to step 831 to perform channel allocation.

When the channel allocation is completed in step 831, the process proceeds to step 833 to perform channel allocation for the next user terminal. Alternatively, when channel allocation for a user terminal 100 fails in steps 811 and 829, as a channel cannot be allocated in steps 809 and 827, the process proceeds to step 833 to perform channel allocation for the next user terminal.

Next, a scheduling method for ensuring fairness such that the BS can allow a plurality of user terminals to equally occupy channel resources will be described. The scheduling method for ensuring fairness is performed through the power controller 215 of FIG. 7.

First, the fairness is a factor for determining performance of the scheduler 210 included in the BS 200 of FIG. 2. The fairness allows time slots to be uniformly allocated to active user terminals 100. In a conventional method for selecting a user terminal with a better channel state, there is a problem in that the user terminal with the better channel state exclusively occupies a time slot.

Scheduling schemes for addressing this problem are classified into a proportional fair (PF) scheme and a round robin (RR) scheme. The PF scheme selects a user terminal with a relatively better channel state from multiple user terminals as compared with the mean capacity value in a multiple access system, and improves system performance and fixedness. In Institute of Electrical and Electronics Engineers (IEEE) 802.16a, users corresponding to the number of 32 subchannels can be selected in one time slot. However, because new channels are allocated to users per time slot due to time-variant channel characteristics, it is difficult for the mean capacity of each user to be estimated. A PF priority matrix $l_k$ of User Terminal k is computed using the mean capacity in the frequency domain for all 32 subchannels such that the window (or window feedback (WFB)) scheme is applied to the PF scheme. This is defined as shown in Equation (5).

$$i_{max} = \arg\max(l_k(i))$$

$$l_k(i) = \sum_{f=53(i-1)+1}^{53i} \frac{C_{ZF,k}(f)}{C_{avr,k}(f)}$$

$$i_{max} = l_k(i_{max})$$

Equation (5)

The user terminal selection process based on Equation (5) in the BS is performed as described above. Accordingly, an amount of feedback information based on the above-described window scheme can be applied to the PF scheme. In this case, channel capacity increases due to the secondary channel allocation, and also fixedness is ensured. In the case of the RR scheme, the scheduler 210 of FIG. 2 in the IEEE 802.16a OFDMA system does not select one user terminal.

When a subchannel is allocated in response to the feedback information, the system of the present invention can significantly improve performance as compared with the conventional RR system.

A method for ensuring fairness using Equation (5) can be applied to an OFDMA/time division duplex (TDD) system based on IEEE 802.16 d/e as well as an OFDMA/FDD system.

Now, simulation results of system performance when channel allocation is performed in the scheduling scheme in accordance with an embodiment of the present invention will be described.

Simulations for a performance comparison between proposed schemes were performed in the following environments. It was assumed that an interval of the BS and each receiver antenna is significantly greater than a coherent distance. A 2×2 MIMO Rayleigh fading channel matrix model was used. For each user terminal, a mean Root Mean Square (RMS) delay spread was set to 80 nsec, and a coherent bandwidth was set to 1.25 MHz. It was assumed that a channel is invariant during a scheduling time. A signal-to-noise ratio (SNR) was uniformly distributed between 0~20 dB for users under good and bad channel environments among k users such that fairness is ensured.

Simulation results are as follows. As the number of users increases in the scheduling scheme using multiuser diversity, system performance increases. Contrast groups for a performance comparison with the window (or WFB) scheme proposed by an embodiment of the present invention were set according to the conventional full feedback scheme for feeding back channel capacity information of all 32 subchannels for user terminals, a scheme for transmitting a channel number with the highest capacity and the largest capacity value, and a scheme for transmitting a channel number with the highest capacity, the largest capacity value, a channel number with the second highest capacity, and the second largest capacity value.

Figure 9:
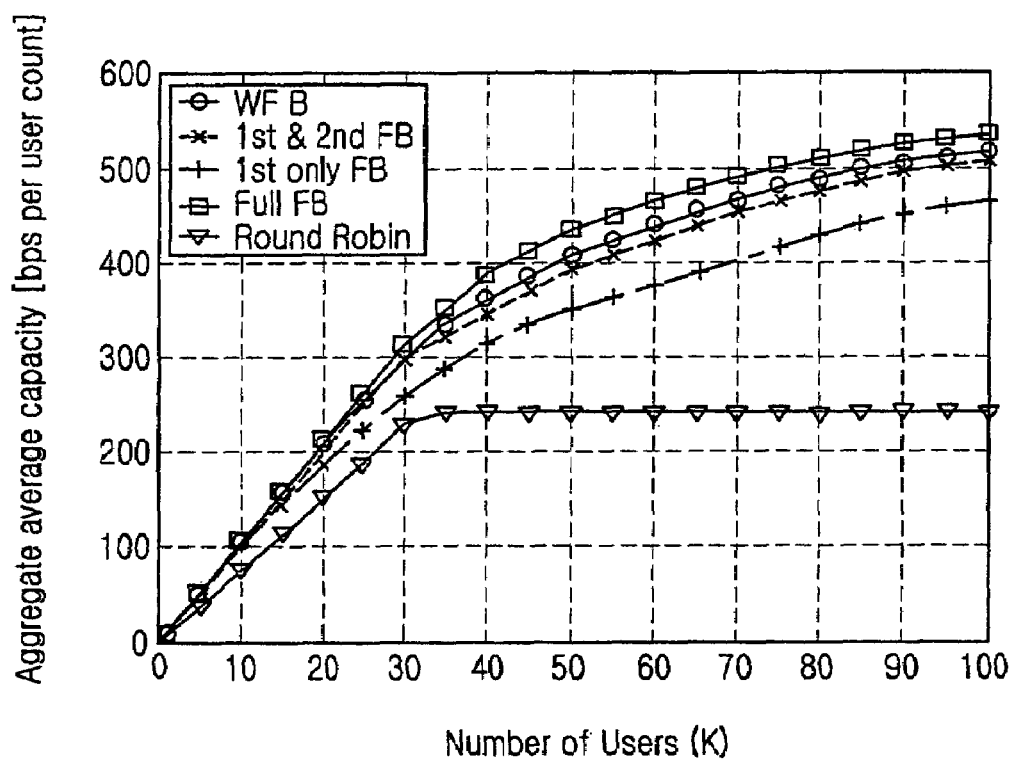
FIG. 9 is a graph illustrating system performance when a scheduling method is performed in accordance with an embodiment of the present invention.

FIG. 9 is a graph illustrating system performance when a scheduling method is performed in accordance with an embodiment of the present invention. When the window (or WFB) scheme provided by an embodiment of the present invention is used, it can be found that system performance of the window scheme is closest to that of the full feedback scheme. Although a channel with the maximum capacity based on feedback information received from a user terminal is not allocated, the window scheme can allocate an empty channel closest to the maximum capacity channel in an adjacent channel range. Accordingly, system performance can be improved because adjacent channel frequency characteristics are similar.

Figure 10:
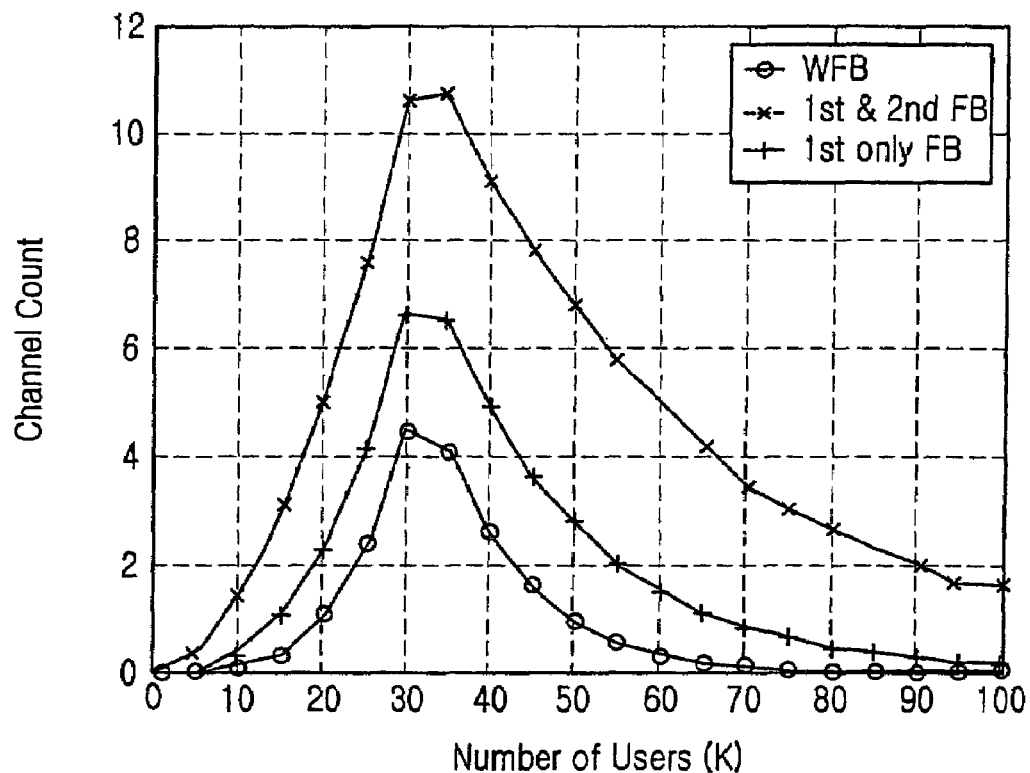
FIG. 10 is a graph illustrating the average number of channel non-allocations due to the already allocated channels in channel allocation when the scheduling method is performed in accordance with an embodiment of the present invention.

FIG. 10 is a graph illustrating the average number of channel non-allocations due to the already allocated channels in channel allocation when the scheduling method is performed in accordance with an embodiment of the present invention. As illustrated in FIG. 10, it can be found that the window (or WFB) scheme provided by an embodiment of the present invention has the highest channel allocation probability. It can be found that the scheme in accordance with an embodiment of the invention is advantageous in short-term fairness.

To evaluate the fairness degree, a coefficient of variation (CoV) is conventionally used. The CoV associated with the number of time slots occupied by each user terminal can be expressed as shown in Equation (6). The lower the CoV value the better the fairness.

$$CoV = (\text{Standard Deviation})/\text{Mean}$$

Equation (6)

Figure 11:
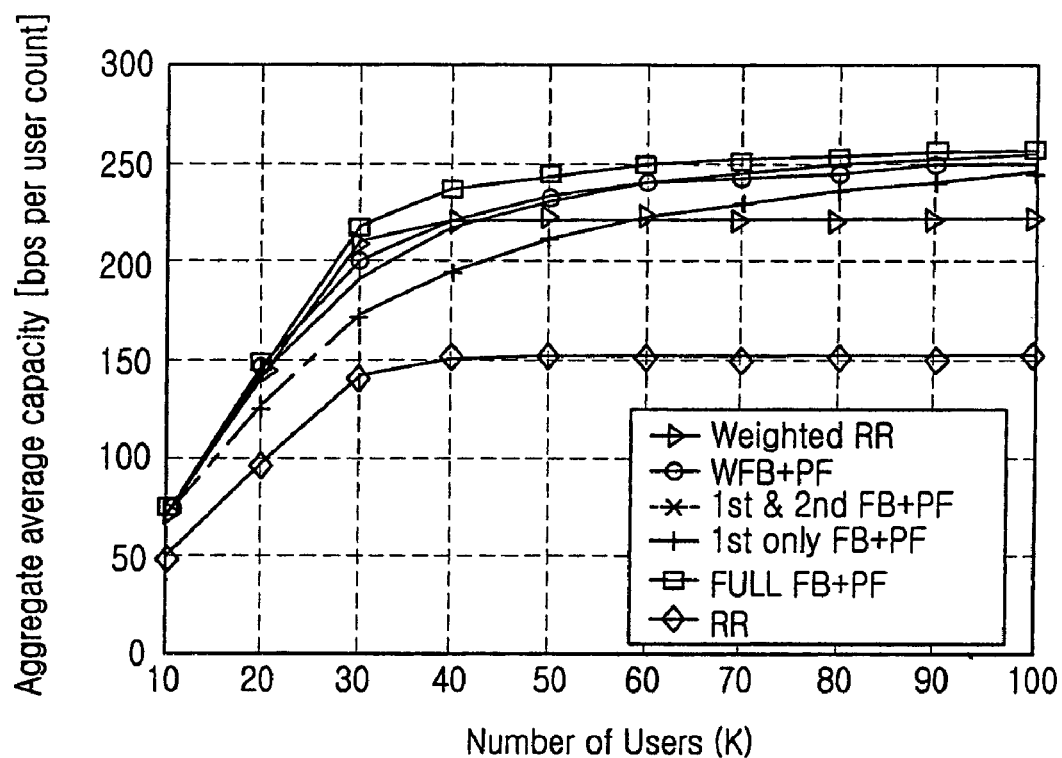
FIG. 11 is a graph illustrating system performance when a proportional fair (PF) scheduler uses the scheduling method in accordance with an embodiment of the present invention.

FIG. 11 is a graph illustrating system performance when a proportional fair (PF) scheduler uses the scheduling method in accordance with an embodiment of the present invention. The scheme provided by an embodiment of the present invention exhibits slight performance degradation due to channel duplication when the number of users is small as compared with the conventional full feedback scheme. It can be found that performance of the scheme provided by an embodiment of the present invention is similar to that of the conventional full feedback scheme when the number of users increases.

Figure 12:
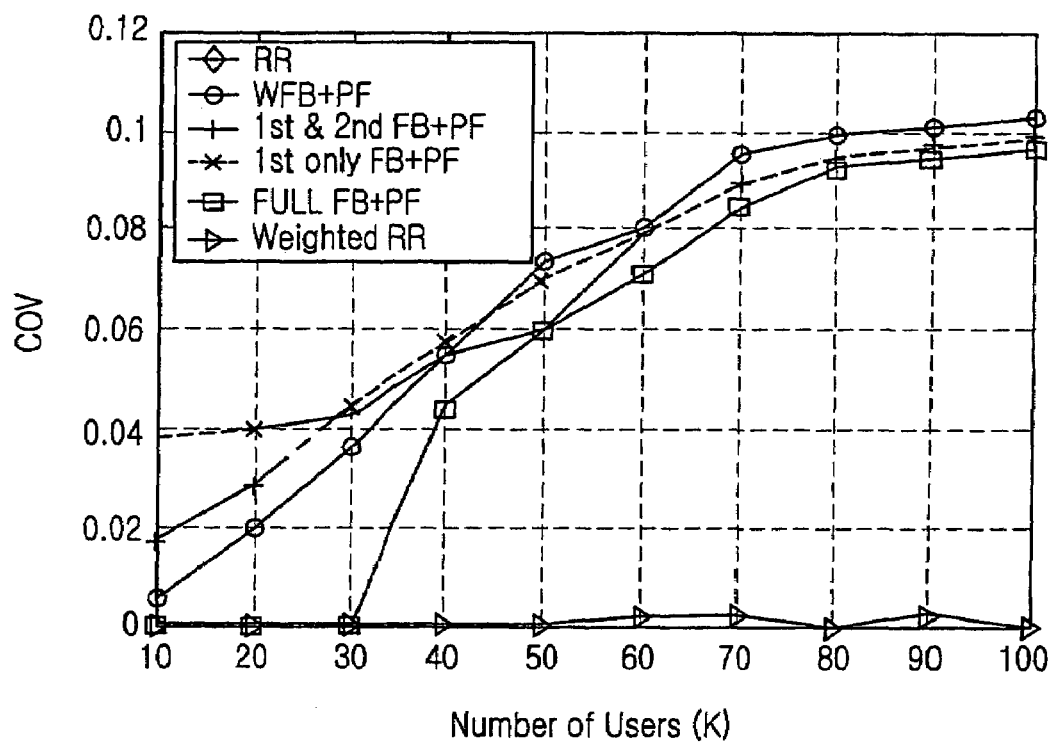
FIG. 12 is a graph illustrating a coefficient of variation (CoV) according to the number of user terminals in the scheduling method in accordance with an embodiment of the present invention.

FIG. 12 is a graph illustrating a CoV according to the number of user terminals in the scheduling method in accordance with an embodiment of the present invention. When the number of users is small, the fairness performance of the scheme proposed by the present invention is better than that of a different scheme. When the number of users is large, the fairness performance of the scheme proposed by the present invention is similar to that of a different scheme. When the number of users that are allocated channels during one scheduling time increases, the scheme provided by an embodiment of the present invention is advantageous in terms of short-term fairness as compared with a scheme of '1st only FB', and a scheme of '1st & 2nd FB+PF' as illustrated in FIG. 10. When the window scheme proposed by the present invention is used along with the conventional RR, it can be found that the window scheme provided by an embodiment of the present invention has excellent performance due to the effect of multiuser diversity according to feedback information, as compared with the conventional RR scheme.

As is apparent from the above description, the present invention provides a downlink channel scheduling method and apparatus for providing optimal system performance by taking into account a channel state of each user terminal in an orthogonal frequency division multiple access/frequency division duplex (OFDMA/FDD) system.

The present invention can reduce a system load using a reduced amount of feedback information at the time of scheduling, and can improve system performance through a multiuser diversity gain. Moreover, the present invention provides an improved fairness scheme for equally allocating time slots to users at the time of scheduling.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for scheduling downlink channels between a base station (BS) and a plurality of terminals in an orthogonal frequency division multiple access (OFDMA) wireless communication system, comprising the steps of:
    computing a plurality of channel capacities and searching for a channel with a maximum capacity in the terminals;
    sending feedback information comprising a channel number and a capacity value of the channel with the maximum capacity from the terminals to the BS, wherein the feedback information additionally comprises a predetermined window bit for determining an adjacent channel range of the channel with the maximum capacity; and
    allocating a channel with the maximum capacity to each terminal on a basis of the feedback information in the BS.

2. The method of claim 1, further comprising the step of:
    allocating an adjacent channel to a corresponding terminal using the window bit when the terminal is not allocated a channel with the maximum capacity in the channel allocation process.

3. The method of claim 2, wherein the window bit has at least one bit value, an adjacent channel in a first condition determined by the at least one bit value is defined within a left and right range of ±1 from the channel number associated with the maximum capacity, and an adjacent channel in a second condition determined by the at least one bit value is defined within a left and right range of ±2 from the channel number associated with the maximum capacity.

4. The method of claim 2, wherein the window bit is determined by:

$$\text{window} = \min(\text{left width}, \text{right width}),$$

$$\text{winwidth} = \min(\text{window}, 2), \text{ and}$$

$$\text{feedwidth} = \begin{Bmatrix} 0, & \text{winwidth} = 1 \\ 1, & \text{winwidth} = 2 \end{Bmatrix},$$

where 'window' defines a first adjacent channel range of left and right sides associated with capacity greater than or equal to a mean capacity on a basis of the channel with the maximum capacity, 'winwidth' defines, to a second adjacent channel range, a smaller value when a minimum adjacent channel range value of the first adjacent channel range is compared with a maximum threshold value (2) within a coherent bandwidth, and 'feedwidth' serving as the window bit is set to 0 when the second adjacent channel range is determined to be 1, and is set to 1 when the second adjacent channel range is determined to be 2.

5. The method of claim 2, wherein the step of setting the window bit in each terminal comprises the steps of:
    determining a first adjacent channel range of left and right sides associated with capacity greater than or equal to a mean capacity on a basis of the channel with the maximum capacity;
    determining, as a second adjacent channel range, a smaller value when a minimum adjacent channel range value of the first adjacent channel range is compared with a maximum threshold value within a coherent bandwidth; and
    setting the window bit value corresponding to the second adjacent channel range.

6. The method of claim 2, further comprising the step of:
    distributing, to other terminals, power to be allocated to a corresponding terminal when the terminal is not allocated the adjacent channel in the channel allocation process.

7. The method of claim 2, further comprising the step of:
    allocating time slots to the terminals using a proportional fair (PF) scheme when scheduling is performed.

8. The method of claim 2, wherein a proportional fair (PF) priority matrix of Terminal k using a mean channel capacity in a frequency domain of an entire channel is determined by:

$$i_{\max} = \arg\max(l_k(i)),$$

$$l_k(i) = \sum_{f=53(i-1)+1}^{53i} \frac{C_{ZF,k}(f)}{C_{avr,k}(f)}, \text{ and}$$

$$i_{\max} = l_k(i_{\max}),$$

where $l_k(i)$ denotes the priority matrix, $i_{max}$ denotes an index of a subchannel with a maximum capacity, $C_{ZF,k}(f)$ denotes a channel capacity at a frequency f, and $C_{avr,k}(f)$ denotes the mean channel capacity.

9. The method of claim 8, wherein the PF priority matrix is applied to an OFDMA/frequency division duplex (FDD) system.

10. The method of claim 8, wherein the PF priority matrix is applied to an OFDMA/time division duplex (TDD) system.

11. The method of claim 2, further comprising the step of:
allocating time slots to the terminals using a round robin (RR) scheme when scheduling is performed.

12. An orthogonal frequency division multiple access (OFDMA) wireless communication system, comprising:
a plurality of terminals for computing a plurality of channel capacities, searching for a channel with a maximum capacity, generating feedback information comprising a channel number and a capacity value of the channel with the maximum capacity, wherein the feedback information additionally comprises a predetermined window bit for determining an adjacent channel range of the channel with the maximum capacity, and sending the generated feedback information to a wireless network; and
a base station (BS) for allocating a channel with a maximum capacity to each terminal on a basis of the feedback information received from the plurality of terminals.

13. The OFDMA wireless communication system of claim 12, wherein the BS allocates an adjacent channel to a corresponding terminal using the window bit when the terminal is not allocated a channel with the maximum capacity in the channel allocation process.

14. The OFDMA wireless communication system of claim 12, wherein the BS allocates time slots to the plurality of terminals using a proportional fair (PF) scheme when downlink channels are scheduled.

15. A method for generating feedback information from a terminal for downlinik channel scheduling of a base station (BS) in an orthogonal frequency division multiple access (OFDMA) wireless communication system, comprising the steps of:
searching for a channel with a maximum capacity from a plurality of channels;
estimating an adjacent channel range of the channel with a maximum capacity;
generating a predetermined window bit for determining the adjacent channel range; and
generating feedback information comprising a channel number and a capacity value of the channel with the maximum capacity;
wherein the feedback information additionally comprises a predetermined window bit for determining an adjacent channel range of the channel with the maximum capacity.

16. The method of claim 15, wherein the window bit has at least one bit value, and wherein the step of estimating the adjacent channel range comprises the steps of:
defining an adjacent channel within a left and right range of ±1 from the channel number associated with the maximum capacity when the window bit is 0; and
defining an adjacent channel within a left and right range of ±2 from the channel number associated with the maximum capacity when the window bit is 1.

17. The method of claim 16, wherein the window bit is determined by:

$$window = \min(\text{left width, right width}),$$

$$winwidth = \min(window, 2), \text{ and}$$

$$feedwidth = \begin{Bmatrix} 0, & winwidth = 1 \\ 1, & winwidth = 2 \end{Bmatrix},$$

where 'window' defines a first adjacent channel range of left and right sides associated with capacity greater than or equal to a mean capacity on a basis of the channel with the maximum capacity, 'winwidth' defines, to a second adjacent channel range, a smaller value when a minimum adjacent channel range value of the first adjacent channel range is compared with a maximum threshold value (2) within a coherent bandwidth, and 'feedwidth' serving as the window bit is set to 0 when the second adjacent channel range is determined to be 1, and is set to 1 when the second adjacent channel range is determined to be 2.

18. The method of claim 15, wherein the step of generating the predetermined window bit in the terminal comprises the steps of:
determining a first adjacent channel range of left and right sides associated with capacity greater than or equal to a mean capacity on a basis of the channel with the maximum capacity;
determining, as a second adjacent channel range, a smaller value when a minimum adjacent channel range value of the first adjacent channel range is compared with a maximum threshold value within a coherent bandwidth; and
setting a window bit value corresponding to the second adjacent channel range.

19. An apparatus for generating feedback information from a terminal for downlinik channel scheduling of a base station (BS) in an orthogonal frequency division multiple access (OFDMA) wireless communication system, comprising:
a channel capacity calculator for computing a plurality of channel capacities and searching for a channel with a maximum capacity;
a window estimator for estimating an adjacent channel range of the channel with the maximum capacity;
a window bit decider for generating a predetermined window bit for determining the adjacent channel range; and
a feedback information combiner for generating feedback information comprising a channel number and a capacity value of the channel with the maximum capacity;
wherein the feedback information additionally comprises a predetermined window bit for determining an adjacent channel range of the channel with the maximum capacity.

20. The apparatus of claim 19, wherein the window estimator estimates a minimum adjacent channel range from a first adjacent channel range after determining the first adjacent channel range of left and right sides associated with capacity greater than or equal to a mean capacity on a basis of the channel with the maximum capacity.

21. The apparatus of claim 20, wherein the window bit decider sets, as a second adjacent channel range, a smaller value when a value of the minimum adjacent channel range is compared with a maximum threshold value within a coherent bandwidth, and generates a window bit value corresponding to the second adjacent channel range.

22. A method for scheduling downlink channels in a base station (BS) of an orthogonal frequency division multiple access (OFDMA) wireless communication system, comprising the steps of:
receiving, from a plurality of terminals, feedback information comprising channel information associated with a maximum capacity and a predetermined window bit indicating an adjacent channel range;

allocating a channel with the maximum capacity to each terminal on a basis of the feedback information; and allocating an adjacent channel to a corresponding terminal using the predetermined window bit when the terminal is not allocated a channel with the maximum capacity.

23. The method of claim 22, further comprising the step of:

distributing, to other terminals, power to be allocated to a corresponding terminal when the terminal is not allocated the adjacent channel in the channel allocation process.

24. An apparatus for scheduling downlink channels in a base station (BS) of an orthogonal frequency division multiple access (OFDMA) wireless communication system, comprising:

a first channel allocator for receiving, from a plurality of terminals, feedback information for channel allocation, and allocating a channel with a maximum capacity to each terminal; and a second channel allocator for allocating a channel to each terminal in an adjacent channel range of the maximum capacity channel determined on a basis of the feedback information, the feedback information comprising channel information associated with the maximum capacity and a predetermined window bit indicating the adjacent channel range.

25. The apparatus of claim 24, further comprising:

a power controller for distributing, to other terminals, power to be allocated to a corresponding terminal when no channel is allocated to the terminal through the second channel allocator.

* * * * *